(12) United States Patent
Jang et al.

(10) Patent No.: US 11,921,628 B2
(45) Date of Patent: Mar. 5, 2024

(54) DATA STORAGE DEVICE FOR DETERMINING A WRITE ADDRESS USING A NEURAL NETWORK

(71) Applicants: SK hynix Inc., Icheon (KR); Korea Advanced Institute of Science and Technology, Daejeon (KR)

(72) Inventors: Junhyeok Jang, Daejeon (KR); Seungkwan Kang, Daejeon (KR); Dongsuk Oh, Daejeon (KR); Myoungsoo Jung, Daejeon (KR)

(73) Assignees: SK hynix Inc., Icheon (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/889,297

(22) Filed: Aug. 16, 2022

(65) Prior Publication Data
US 2023/0297500 A1    Sep. 21, 2023

(30) Foreign Application Priority Data

Mar. 17, 2022    (KR) .......................... 10-2022-0033095

(51) Int. Cl.
*G06F 12/02*    (2006.01)
*G06F 3/06*    (2006.01)
(Continued)

(52) U.S. Cl.
CPC ........ *G06F 12/0246* (2013.01); *G06F 3/0611* (2013.01); *G06F 3/0631* (2013.01); *G06F 3/064* (2013.01); *G06F 3/0679* (2013.01); *G06F 12/0833* (2013.01); *G06F 12/0882* (2013.01); *G06F 12/0891* (2013.01); *G06F 2212/7202* (2013.01)

(58) Field of Classification Search
None
See application file for complete search history.

(56) References Cited

U.S. PATENT DOCUMENTS

2018/0150242 A1* 5/2018 Yi .......................... G06F 3/0656
2020/0110536 A1    4/2020 Navon et al.
(Continued)

FOREIGN PATENT DOCUMENTS

KR    1020210019576 A    2/2021

OTHER PUBLICATIONS

J. Gupta et al., "The architectural implications of facebook's dnn-based personalized recommendation," in 2020 IEEE International Symposium on High Performance Computer Architecture (HPCA), 2020: IEEE, pp. 488-501.

(Continued)

*Primary Examiner* — Nathan Sadler

(57) ABSTRACT

A data storage device includes one or more nonvolatile memory devices each including a plurality of unit storage spaces; and an address recommending circuit configured to recommend a unit storage space among the plurality of unit storage spaces to process a write request, wherein the address recommending circuit applies feature data to a neural network to recommend the unit storage space, and wherein the feature data is generated based on request information for the write request, a target address corresponding to the write request, an address of data stored in the plurality of unit storage spaces.

12 Claims, 6 Drawing Sheets

(51) Int. Cl.
    *G06F 12/0831* (2016.01)
    *G06F 12/0882* (2016.01)
    *G06F 12/0891* (2016.01)

(56) References Cited

U.S. PATENT DOCUMENTS

2020/0133489 A1* 4/2020 Martin ................ G06F 12/0862
2021/0181986 A1* 6/2021 Lee ......................... G06F 3/064
2023/0110401 A1* 4/2023 Zheng ................ G06F 12/0246
                                                                                      711/154

OTHER PUBLICATIONS

J. Liang, Y. Xu, D. Sun and S. Wu, "Improving Read Performance of SSDs via Balanced Redirected Read," 2016 IEEE International Conference on Networking, Architecture and Storage (NAS), 2016, pp. 1-10, doi: 10.1109/NAS.2016.7549406.

N. Elyasi, M. Arjomand, A. Sivasubramaniam, M. T. Kandemir and C. R. Das, "Content Popularity-Based Selective Replication for Read Redirection in SSDs," 2018 IEEE 26th International Symposium on Modeling, Analysis, and Simulation of Computer and Telecommunication Systems (MASCOTS), 2018, pp. 1-15, doi: 10.1109/ MASCOTS.2018.00009.

N. Elyasi, C. Choi, A. Sivasubramaniam, J. Yang and V. Balakrishnan, "Trimming the Tail for Deterministic Read Performance in SSDs," 2019 IEEE International Symposium on Workload Characterization (IISWC), 2019, pp. 49-58, doi: 10.1109/IISWC47752.2019. 9042073.

"Word embeddings," Jun. 16, 2021, https://www.tensorflow.org/text/guide/word_embeddings.

D. Cobb and A. Huffman, "Nvm express and the pci express ssd revolution," in Intel Developer Forum, 2012, vol. 2012: Intel.

J.-W. Park et al., "A 176-Stacked 512Gb 3b/Cell 3D-NAND Flash with 10.8 GB/mm 2 Density with a Peripheral Circuit Under Cell Array Architecture," in 2021 IEEE International Solid-State Circuits Conference (ISSCC), 2021, vol. 64: EEE, pp. 422-423.

M. Jung, "Exploring parallel data access methods in emerging non-volatile memory systems, " IEEE Transactions on Parallel and Distributed Systems, vol. 28, No. 3, pp. 746-759, 2016.

Iotta, "SNIA. " 2011, http://iotta.snia.org/.

M. Abadi et al., "Tensorflow: A system for large-scale machine learning," in 12th USENIX symposium on operating systems design and implementation (OSDI 16), 2016, pp. 265-283.

* cited by examiner

DATA STORAGE DEVICE FOR DETERMINING A WRITE ADDRESS USING A NEURAL NETWORK

CROSS-REFERENCE TO RELATED APPLICATION

The present application claims priority under 35 U.S.C. § 119(a) to Korean Patent Application No. 10-2022-0033095, filed on Mar. 17, 2022, which is incorporated herein by reference in its entirety.

BACKGROUND

1. Technical Field

Various embodiments of the present disclosure generally relate to a data storage device for determining a write address using a neural network.

2. Related Art

A solid state drive (SSD) stores data in a semiconductor memory device such as a NAND flash memory device.

A NAND flash memory device has an input/output (I/O) bandwidth of up to 320 MB/s for reading data and up to 42 MB/s for writing data per a single plane.

In contrast, an NVMe (nonvolatile memory express) interface used in an SSD has a maximum bandwidth of 7.9 GB/s.

Therefore, in order to overcome a speed difference between an NVMe interface device and a NAND flash memory device, a DRAM buffer is employed or technology for processing data in parallel by distributing data into different channels, chips, dies, and/or planes is adopted.

For example, during a write operation, a write delay can be hidden by storing data in the DRAM buffer and flushing the data stored in the DRAM buffer to the NAND flash memory device.

However, during a read operation, a read delay cannot be hidden because data output from the NAND flash memory device has to wait until it is output through the DRAM buffer to the outside.

Because read requests provided to data storage devices such as SSDs generally have random address patterns, it is difficult to improve read performance by prefetching data. Therefore, performing read operations in parallel is the only way to improve the read performance.

In the conventional SSD, parallel processing operations such as channel striping for distributing I/O requests to multiple channels and way pipelining for processing I/O requests at one package while an I/O request is being processed at another package may be performed.

In addition, a NAND flash memory device includes a plurality of independently operable dies, and each die includes a plurality of planes. A die may be referred to as a way.

Accordingly, parallel processing is performed through die interleaving in which requests are alternately sent to multiple dies and multiplane operations in which two or more planes are simultaneously operated.

Conventionally, a write address can be determined by considering parallel processing operations at channel, package, die, and/or plane levels. However, in this case, since a read request pattern to be provided in future cannot be considered, the parallelism of a data storage device cannot be used to the maximum.

As a result, when a plurality of read requests for data stored in the same channel or the same die are provided, it is impossible to perform corresponding read operations in parallel. Therefore, it is difficult to improve read performance.

SUMMARY

In accordance with an embodiment of the present disclosure, a data storage device may include one or more nonvolatile memory devices each including a plurality of unit storage spaces; and an address recommending circuit configured to recommend a unit storage space among the plurality of unit storage spaces to process a write request, wherein the address recommending circuit applies a plurality of feature data corresponding to the plurality of unit storage spaces to a neural network to recommend the unit storage space, and wherein the plurality of feature data are generated based on request information for the write request, a target address corresponding to the write request, an address of data stored in the plurality of unit storage spaces.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and beneficial aspects of those embodiments.

DETAILED DESCRIPTION

The following detailed description references the accompanying figures in describing illustrative embodiments consistent with this disclosure. These embodiments are provided for illustrative purposes and are not exhaustive. Additional embodiments not explicitly illustrated or described are possible. Further, modifications can be made to the presented embodiments within the scope of teachings of the present disclosure. The detailed description is not meant to limit embodiments of this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
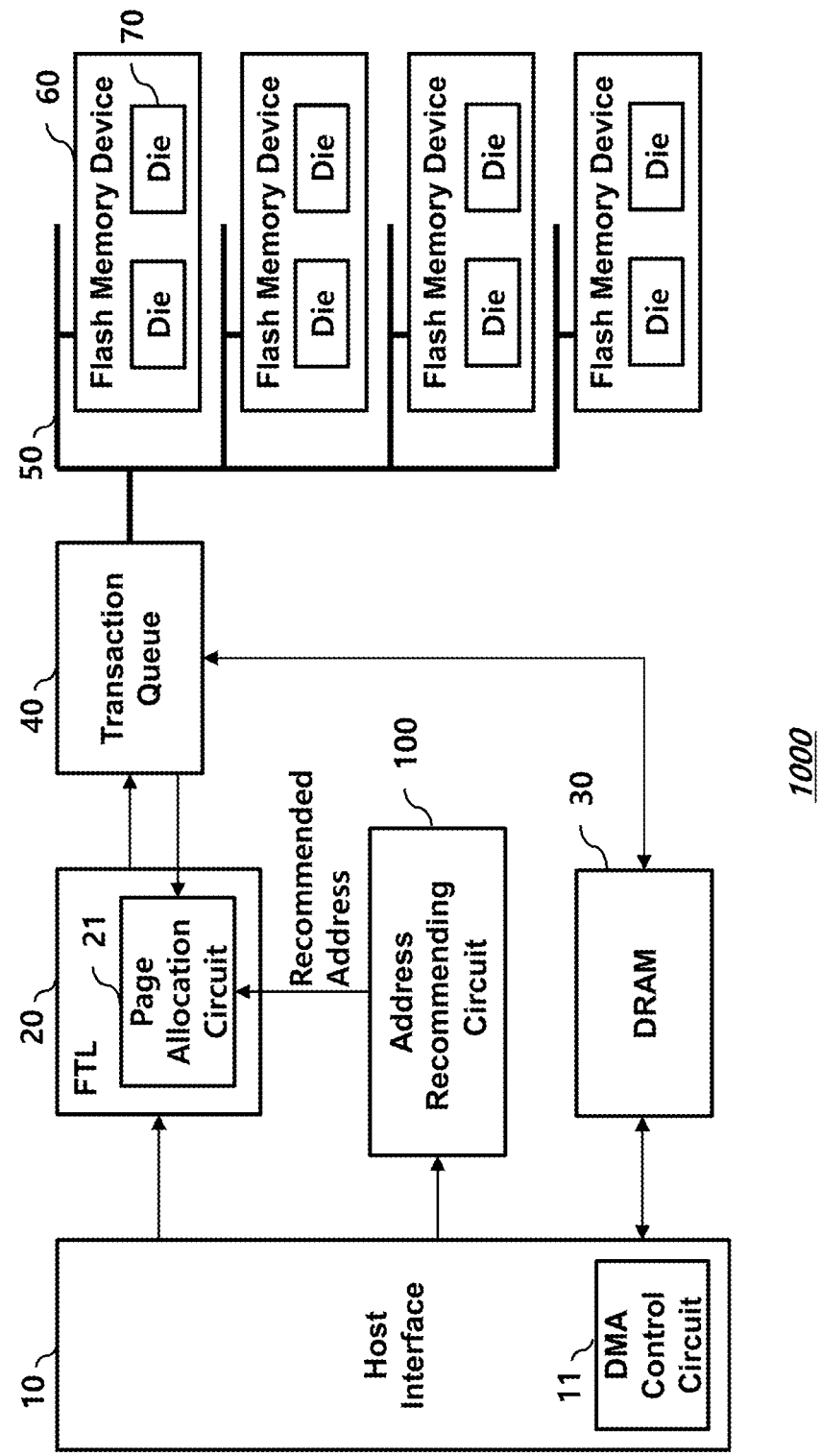
FIG. 1 illustrates a block diagram of a data storage device according to an embodiment of the present disclosure.

FIG. 1 is a block diagram illustrating a data storage device 1000 according to an embodiment of the present disclosure.

Hereinafter, a solid state drive (SSD) including a NAND flash memory device will be used as an example of the data storage device 1000 to disclose the present invention.

Accordingly, the data storage device 1000 may be referred to as an SSD or an SSD device.

The data storage device 1000 includes a host interface 10, a Flash Translation Layer (FTL) 20, a Dynamic Random Access Memory (DRAM) 30, a transaction queue 40, a channel 50, and a flash memory device 60.

The data storage device 1000 further includes an address recommending circuit 100.

The host interface 10 receives a request from a host (not shown) according to, for example, the NVMe standard, and transmits a processing result of the request to the host. Since the interface technology itself supporting the NVMe standard is well known, a detailed description thereof will be omitted.

The host interface 10 decodes the request from the host and generates a write request in units of pages. When a size of write data exceeds a size of one page, the host interface 10 may generate a plurality of write requests respectively corresponding to a plurality of pages in which the write data is to be stored and provide them to the FTL 20 and the address recommending circuit 100.

In this case, the plurality of write requests respectively corresponding to the plurality of pages may be sequentially provided to the FTL 20 and the address recommending circuit 100. Accordingly, the FTL and the address recommending circuit 100 may operate in units of logical pages, a logical page corresponding to one of the plurality of pages, e.g., a plurality of physical pages.

An FTL is an element commonly used in SSDs and controls operations such as address mapping, garbage collection, and wear leveling. Since a general configuration and operations of the FTL are well known, a detailed description thereof will be omitted.

In this embodiment, the FTL 20 further includes a page allocation circuit 21.

The page allocation circuit 21 allocates, to the write data, a page included in a unit storage space corresponding to a recommended address provided by the address recommending circuit 100 in response to a write request from the host interface 10.

In this embodiment, a unit storage space capable of performing parallel processing is a die, and thus the recommended address provided by the address recommending circuit 100 corresponds to a die address. Hereinafter, a die address may be referred to as a die number or a die ID that identifies a corresponding die. In a flash memory device, a die may be referred to as a way, and thus a die address may also be referred to as a way address.

That is, the page allocation circuit 21 provides an address designating a physical page included in a die as an actual write address. The address designating the physical page may be referred to as a physical page address. The physical page address may be referred to as a write address corresponding to the write request, and the page allocation circuit 21 may be referred to as an address allocation circuit.

The recommended address provided by the address recommending circuit 100 is not limited to a die address. In another embodiment, an address of another unit storage space capable of performing parallel processing may be provided as a recommended address.

For example, in consideration of securing parallelism in units of channels, a channel address designating a channel may be provided as a recommended address, and the page allocation circuit 21 allocates, to the write data, a page within a recommended channel.

In another example, it may be considered to secure the parallelism in units of planes, which is a sub-unit of a die. In this case, a plane address designating a plane may be provided as a recommended address, and the page allocation circuit 21 may allocate, to the write data, a page within a recommended plane.

In addition, various design changes are possible, and the design changes can be easily known to those skilled in the art from the disclosure of the present embodiment.

The DRAM 30 is connected between the host and the transaction queue 40 to store data for a read request or data for a write request.

The host interface 10 includes a direct memory access (DMA) control circuit 11 through which data stored in the host can be written into the DRAM 30 or data stored in the DRAM 30 can be provided to the host using DMA technology.

Since the DMA technology itself for transmitting and receiving data between the host and the SSD 1000 is well known, a detailed description thereof will be omitted.

The FTL 20 may perform an address mapping operation according to a page allocated by the page allocation circuit 21.

The transaction queue 40 performs a queuing operation for queuing commands and data in response to read and write requests.

Since the queuing operation of the transaction queue 40 itself is well known, a detailed description thereof will be omitted.

The flash memory device 60 is connected to the channel 50 to transmit and receive commands and data.

Although FIG. 1 illustrates four channels 50, the number of channels 50 may be variously changed according to embodiments.

Although one flash memory device 60 is connected to one channel 50 in FIG. 1, a plurality of flash memory devices 60 may be connected to one channel 50 according to embodiments.

Each of the flash memory devices 60 includes a plurality of dies 70 that can operate in parallel.

Although one flash memory device 60 includes two dies 70 in FIG. 1, a larger number of dies 70 may be included in one flash memory device 60 according to embodiments.

When the address recommending circuit 100 receives a write request from the host interface 10, it determines a recommended address corresponding to the write request and provides the recommended address to the page allocation circuit 21. As described above, the recommended address may correspond to a die address in an embodiment. The die address may be an address designating a die in the flash memory device 60.

In this embodiment, the address recommending circuit 100 uses a neural network technique to determine the recommended address.

The address recommending circuit 100 may be implemented in hardware, software, or a combination of hardware and software to perform a learning operation on a neural network and perform an inference operation using the learned neural network.

The address recommending circuit 100 determines the recommended address to maximize internal parallelism in an operation of processing a read request to be performed in the future.

In this embodiment, probability that a request will be given to each die at a similar time when the request is given to a target page to be allocated is predicted using target page information for the target page and page information stored in each die, and a page in a die corresponding to the lowest probability is allocated as the target page. Therefore, a die address designating the die corresponding to the lowest probability may be provided as the recommended address.

The address recommending circuit 100 recommends the die address having the lowest probability by using a neural network technique.

In this embodiment, a conventional recommendation system, which is a type of neural network technology, is applied to the address recommending circuit 100. The conventional recommendation system compares a first embedding vector indicating user information with a second embedding vector indicating item information, and outputs a probability that a user selects a given item.

Since the configuration and operation of the conventional recommendation system have been described in detail in articles such as r U. Gupta et al., "The architectural implications of facebook's dnn-based personalized recommendation," in 2020 IEEE International Symposium on High Performance Computer Architecture (HPCA), 2020: IEEE, pp. 488-501, a detailed description thereof will be omitted.

Figure 2:
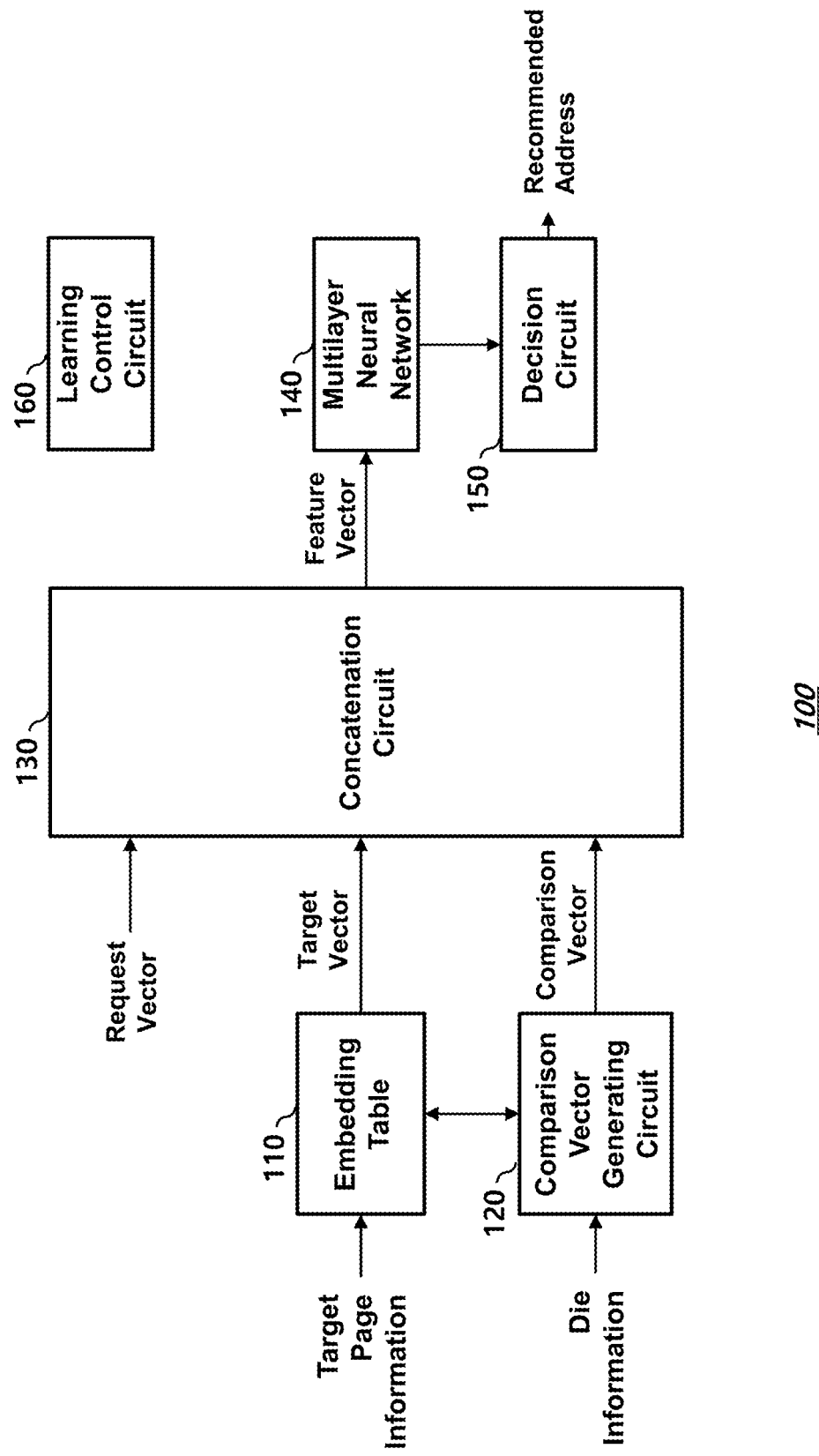
FIG. 2 illustrates an address recommending circuit according to an embodiment of the present disclosure.

FIG. 2 is a block diagram showing the address recommending circuit 100 of FIG. 1 according to an embodiment of the present disclosure.

Referring to FIG. 2, the address recommending circuit 100 includes an embedding table 110, a comparison vector generating circuit 120, a concatenation circuit 130, a multilayer neural network circuit 140, and a decision circuit 150.

The decision circuit 150 determines the recommended address with reference to a die-by-die score output from the multilayer neural network circuit 140. The die-by-die score is a score for each die, and thus each die has its own score.

For example, a die-by-die score for a certain die may correspond to probability that a request will be given to a page in the certain die when the request is given to a target page. In this case, an address of a die having the lowest score may be determined as the recommended address.

In an embodiment, the multilayer neural network circuit 140 receives a feature vector for a specific die and outputs a corresponding score for the specific die. After repeating similar operations for a plurality of dies, the multilayer neural network circuit 140 determines corresponding scores for the plurality of dies. The multilayer neural network circuit 140 may have a form of a fully connected neural network.

The concatenation circuit 130 generates one feature vector by concatenating a request vector, a target vector, and a comparison vector.

The request vector provided to the concatenation circuit 130 includes, as elements, information about whether a request is a sequential request or a random request and a size of the request. The request vector corresponds to a write request provided from the host interface 10 of FIG. 1. For example, when a first request is for a logical page address between 1 and 10 and a second request given after the first request is for a logical page address between 11 and 20, then the second request is a sequential request. If the second request is for a page address 31 and 40, then the second request is a random request.

Also, in order not to recommend the same die for successive requests, the request vector may further include a die address recommended for a previous request.

The embedding table 110 includes a plurality of rows. Each row can be accessed using a logical page address, and each row stores an embedding vector corresponding to the logical page address. A logical page address may be expressed as a logical page number (LPN).

Figure 3:
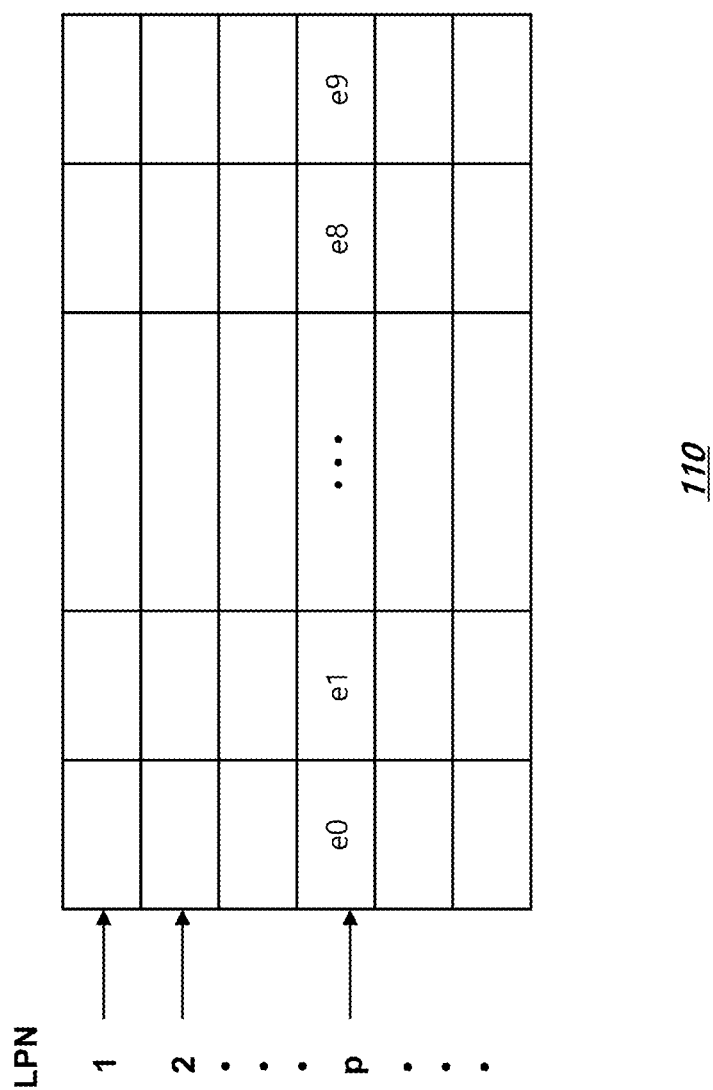
FIG. 3 illustrates an embedding table according to an embodiment of the present disclosure.

FIG. 3 shows the embedding table 110 of FIG. 2 according to an embodiment of the present disclosure.

Referring to FIG. 3, the embedding table 110 includes a plurality of rows respectively corresponding to a plurality of logical page addresses (LPNs). For example, an embedding vector corresponding to a pth logical page address p is {e0, e1, . . . , e8, e9}.

Since the embedding technology for converting input data into a vector form is well known, a detailed description thereof will be omitted.

The embedding table 110 is determined through a neural network learning operation, which will be described in detail below.

In this embodiment, the embedding table 110 receives, as input data, target page information that corresponds to a logical page address (LPN) for a write request provided by the host interface 10 of FIG. 1, i.e., a write-requested logical page address. The target page information is provided to the embedding table 110 when the write request is provided by the host interface 10.

Referring back to FIG. 2, the comparison vector generating circuit 120 generates a plurality of comparison vectors respectively corresponding to a plurality of dies.

The comparison vector generating circuit 120 receives a plurality of embedding vectors from the embedding table 110 by applying each of logical pages corresponding to data stored in a first die to the embedding table 110, and generates a comparison vector corresponding to the first die by adding up the plurality of embedding vectors.

In this way, the plurality of comparison vectors respectively corresponding to the plurality of dies are generated. Information on logical pages corresponding to data stored in a die may be referred to as die information in FIG. 2. The die information in FIG. 2 may be stored as a table form in the address recommending circuit 100.

The target vector may be generated in response to a write-requested logical address whenever a write request for a target page is input. For example, an embedding vector corresponding to the write-requested logical address is chosen from the embedding table 110, and the chosen embedding vector is output as the target vector.

In contrast, the comparison vector generating circuit 120 may generates a comparison vector in advance before the write request is performed in a given die including the target page.

The comparison vector generating circuit 120 may additionally perform an update operation for the comparison vector after the write request is performed in the given die.

Figure 4:
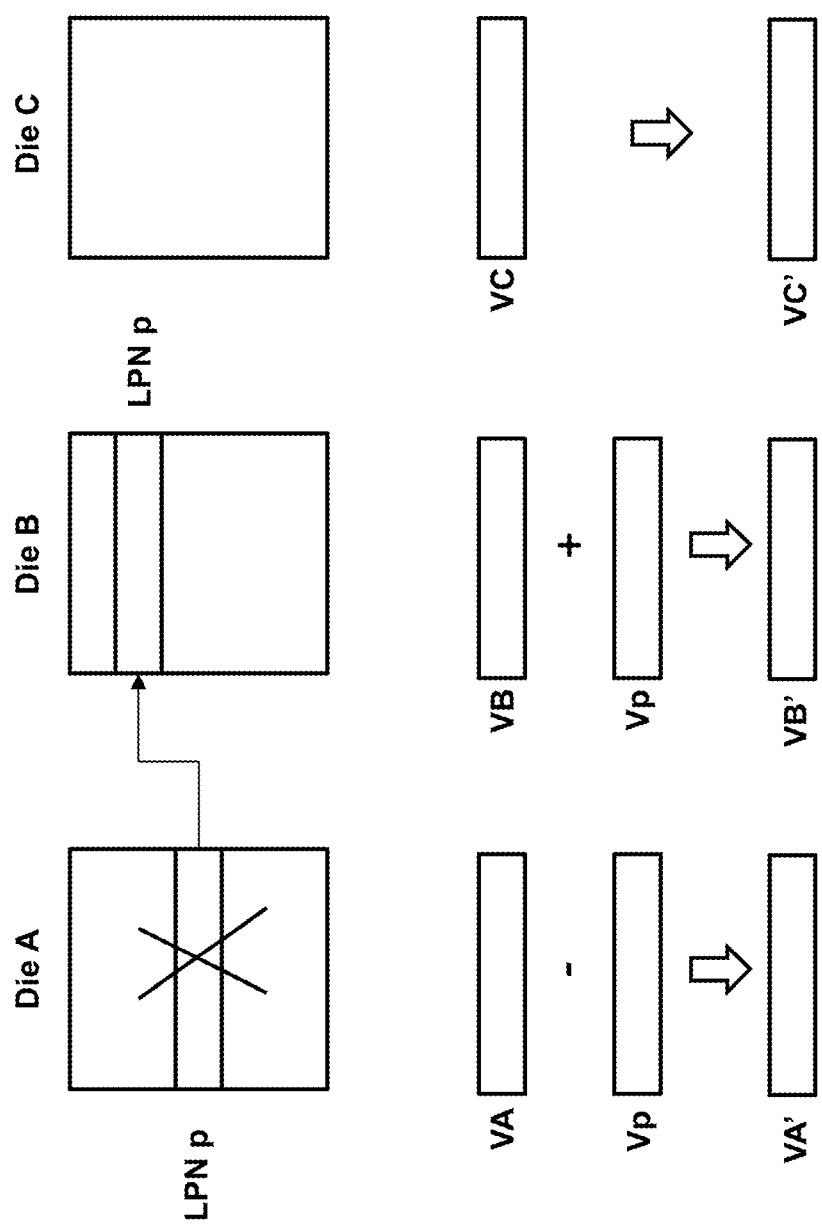
FIG. 4 illustrates an operation of updating a comparison vector according to an embodiment of the present disclosure.

FIG. 4 is a diagram for explaining an update operation of a comparison vector according to an embodiment of the present disclosure.

FIG. 4 shows a case where a logical page address p on a die A is invalidated and the logical page address p is validated on a die B. That is, in this case, the logical page address p is matched to a physical page address of the die B after matching the logical page address p to a physical page address of the die A is invalidated.

Hereinafter, an embedding vector corresponding to the logical page address p is expressed as Vp.

A value obtained by subtracting the embedding vector Vp from the existing comparison vector VA corresponding to the die A is set as a new comparison vector VA'. In the update operation, the existing comparison vector VA corresponding to the die A is updated with the new comparison vector VA'.

In addition, a value obtained by adding the embedding vector Vp to the existing comparison vector VB corresponding to the die B is set as a new comparison vector VB'. In the update operation, the existing comparison vector VB corresponding to the die B is updated with the new comparison vector VB'.

Since a die C is not affected by the above update operation associated with the die A and the die B, a comparison vector VC' corresponding to the die C after the update operation is the same as a is previous comparison vector VC. That is, in the update operation, the existing comparison vector VC is maintained.

In a burst operation in which I/O requests are provided with short time intervals, the I/O performance of the SSD 1000 of FIG. 1 may be deteriorated due to the inference operation of the address recommending circuit 100 of FIG. 1.

Referring to FIG. 2, the target vector output from the embedding table 110 must be newly created whenever a request is input.

On the other hand, since the comparison vector output from the comparison vector generating circuit 120 does not change unless a logical page address of data stored in each die is changed, it is possible to prevent performance degradation by calculating the comparison vector in advance during a time period in which a host request is not provided by the host.

When a write request or an erase request is performed on a given die, a comparison vector of the given die must be newly calculated for the given die. In the present embodiment, as shown in FIG. 4, a time required to calculate the comparison vector can be reduced by adding or subtracting the embedding vector corresponding to the affected page to or from the existing comparison vector.

Additionally, in the present embodiment, performance degradation can be prevented by hiding the inference operation in an I/O operation of the SSD 1000.

Referring to FIG. 1, when the host sends an I/O request to the SSD 1000, the host interface 10 interprets the I/O request transmitted using the NVMe protocol to find out a type of the I/O request, a logical address, a data length, and a host memory address.

Thereafter, the DMA control circuit 11 reads write data from the host using the host memory address and stores the write data in the DRAM or stores read data of the DRAM 30 in the host.

In this embodiment, the inference operation of the address recommending circuit 100 may be performed during a DMA operation for storing data in the DRAM 30 to save a time required for the inference operation of the address recommending circuit 100, thereby preventing performance degradation of the SSD 1000.

Referring to FIG. 2, the embedding table 110 and the multilayer neural network circuit 140 of the address recommending circuit 100 include variables whose values are adjusted through learning operations.

In this embodiment, the learning operations are simultaneously performed in the embedding table 110 and the multilayer neural network circuit 140, but in another embodiment, the learning operations may be performed separately in the embedding table 110 and the multilayer neural network circuit 140.

In the present embodiment, a learning operation is performed in the address recommending circuit 100 by applying a supervised learning method.

In the supervised learning method, coefficients are adjusted using an output value corresponding to an input value and a true value corresponding to the input value. Since such a supervised learning method itself is well known, a detailed description thereof will be omitted.

For the supervised learning method, it is necessary to prepare a data set including input values input to a neural network and corresponding true values.

In the present embodiment, the data set may be prepared using trace data provided to the SSD 1000 for a predetermined time.

Figure 5:
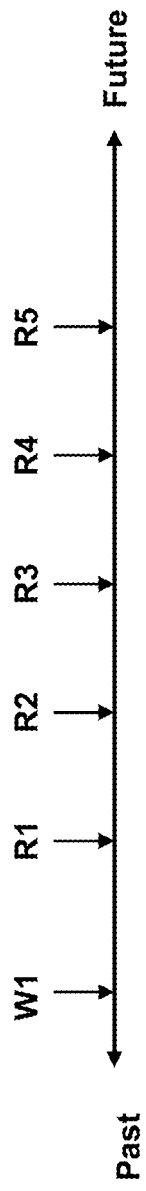
FIGS. 5A and 5B illustrate an operation of generating learning data for a learning operation according to an embodiment of the present disclosure.

FIG. 5A shows an example of trace data. The trace data includes a write request W1 and five read requests R1 to R5 provided thereafter. In FIG. 5A, it is assumed that the fifth read request R5 and the write request W1 are requests for the same logical address.

When creating a data set from the trace data, it is necessary to determine a true value corresponding to a die address to be allocated for the write request W1.

FIG. 5B illustrates a method of determining a true value corresponding to the write request W1 of FIG. 5A.

First, FIG. 5B shows die addresses corresponding to the four read requests R1, R2, R3, and R4.

Referring to FIG. 5B, the first read request R1 is allocated to a die 1 of a channel B, the second read request R2 is allocated to a die 2 of the channel B, the third read request R3 is allocated to a die 2 of a channel A, and the fourth read request R4 is allocated to the die 1 of the channel B.

In FIG. 5B, a "bus" indicates a time period for which data output as a result of a read operation occupies a channel bus.

Referring to FIG. 5B, a processing time of the fifth read request R5 may overlap with processing times of the second, third, and fourth read requests R2, R3, and R4 in consideration of a provided timing of the fifth read request R5. Therefore, in order to improve read performance, it is preferable to select a die that is different from the dies in which the second to fourth read requests R2 to R4 are processed.

Accordingly, in order to improve the parallelism, the fifth read request R5 is preferably performed in a die 1 of the channel A.

Referring to FIG. 5B, a true value of a die address corresponding to the write request W1 is determined as the die 1 of the channel A.

In this way, training data can be prepared from the trace data.

Referring back to FIG. 2, the address recommending circuit 100 may further include a learning control circuit 160.

The learning control circuit 160 may control the supervised learning operation using learning data previously stored in a designated address region of the flash memory device 60 of FIG. 1.

The learning control circuit 160 may store the trace data in the DRAM 30 or in another designated address region of the flash memory device 60 for a predetermined time, and generate the learning data from the trace data, and the learning data can be stored or updated in the designated address region of the flash memory device 60.

Accordingly, the supervised learning operation may be performed only during an initialization operation of the data storage device 1000, may be performed at predetermined time intervals during use of the data storage device 1000, or may be performed during an idle time of the data storage device 1000.

Figure 6:
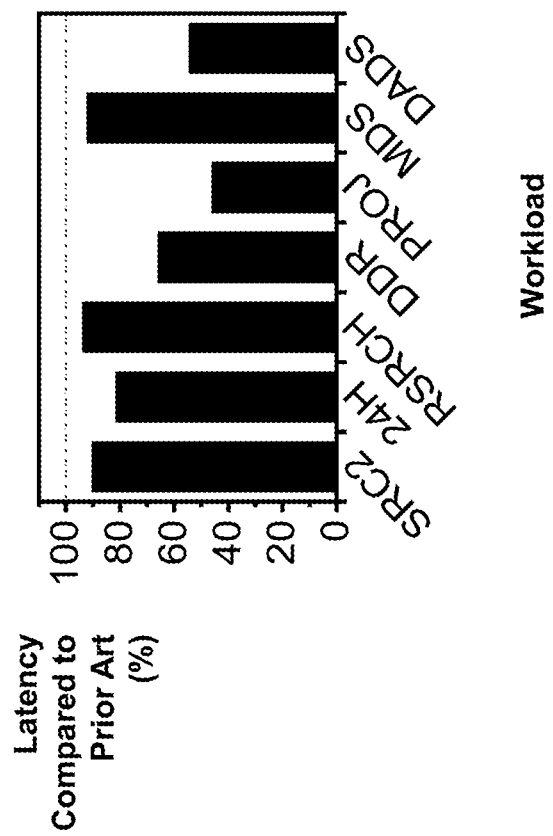
FIG. 6 illustrates a graph showing an effect of an embodiment of the present disclosure.

FIG. 6 is a graph showing an effect of the present embodiment. The graph shows a ratio of a first read latency when a write operation is performed according to the present embodiment to a second read latency when a write operation is performed according to the prior art.

In FIG. 6, the horizontal axis indicates types of workloads and the vertical axis indicates the ratio of the first read latency to the second read latency.

As shown in FIG. 6, a read latency of the write operation is reduced for all the workloads, and an average reduction rate is about 25.4%.

That is, when the present embodiment is employed, the read performance of the data storage device 1000 can be improved.

Although various embodiments have been illustrated and described, various changes and modifications may be made to the described embodiments without departing from the spirit and scope of the invention as defined by the following claims.

What is claimed is:

1. A data storage device, comprising:
one or more nonvolatile memory devices each including a plurality of unit storage spaces; and
an address recommending circuit configured to recommend a unit storage space among the plurality of unit storage spaces to process a write request,
wherein the address recommending circuit applies a plurality of feature data corresponding to the plurality of unit storage spaces to a neural network to recommend the unit storage space,
wherein the plurality of feature data are generated based on request information for the write request, a target address corresponding to the write request, and an address of data stored in the plurality of unit storage spaces,
wherein the address recommending circuit includes:
an embedding table storing an embedding vector corresponding to the address of the data stored in the plurality of unit storage spaces and generating a target vector corresponding to the target address;
a comparison vector generating circuit configured to generate a plurality of comparison vectors by using information of the plurality of unit storage spaces and the embedding vector stored in the embedding table, the plurality of comparison vectors respectively corresponding to the plurality of unit storage spaces; and
a multilayer neural network circuit configured to generate scores for the plurality of unit storage spaces using the plurality of feature data each being generated using a request vector corresponding to the request information, the target vector, and one of the plurality of comparison vectors.

2. The data storage device of claim 1, further comprising an address allocation circuit configured to allocate, as a write address for the write request, an address corresponding to the unit storage space recommended by the address recommending circuit.

3. The data storage device of claim 2, wherein each of the one or more nonvolatile memory devices is a flash memory device,
wherein the unit storage space is a die included in the flash memory device, and
wherein the write address is an address designating a page in a recommended die.

4. The data storage device of claim 3, further comprising:
a host interface configured to receive and decode a request from a host;
a flash translation layer configured to perform an address mapping operation by referring to the write address determined at the address allocation circuit; and
a volatile memory device storing data to be transferred between the host and the data storage device.

5. The data storage device of claim 4, wherein the host interface generates a plurality of write requests respectively corresponding to a plurality of pages according to a length of data to be written in the one or more nonvolatile memory devices.

6. The data storage device of claim 4, wherein information decoded at the host interface includes a memory address of the host, and
wherein the host interface further includes a direct memory access (DMA) control circuit to communicate data between the host and the volatile memory device using the memory address of the host.

7. The data storage device of claim 6, wherein the address recommending circuit determines the unit storage space to perform the write request during when the DMA control circuit stores data from the host in the volatile memory device when the write request is received.

8. The data storage device of claim 1, further comprising a concatenation circuit configured to generate one of the plurality of feature data by concatenating the request vector, the target vector, and one of the plurality of comparison vectors.

9. The data storage device of claim 1, wherein the target address is a logical address, and wherein the comparison vector generating circuit generates a comparison vector by adding up a plurality of embedding vectors respectively corresponding to a plurality of logical addresses of data stored in a unit storage space.

10. The data storage device of claim 9, wherein when a logical address validated on a first unit storage space is invalidated and then the logical page address is validated on a second unit storage space, the comparison vector generating circuit updates a comparison vector of the first unit storage space by removing an embedding vector of the logical address from the comparison vector of the first unit storage space and updates a comparison vector of the second unit storage space by adding the embedding vector of the logical address to the comparison vector of the second unit storage space.

11. The data storage device of claim 1, wherein the address recommending circuit further includes a learning control circuit,
wherein the one or more nonvolatile memory devices stores learning data in a predetermined address, and
wherein the learning control circuit controls a learning operation for the embedding table and the multilayer neural network circuit by using the learning data.

12. The data storage device of claim 11, wherein the learning data is generated from trace data which is a set of requests provided to the data storage device, the set of requests including the write request and a plurality of read requests,
wherein the learning data includes information for the write request and a true value for the unit storage space to be recommended for the write request,
wherein the true value is determined by considering a parallel processing of a read request for a same logical address as that of the write request among the plurality of read requests provided after the write request.

* * * * *